(12) United States Patent  
Nakagawa et al.

(10) Patent No.: US 8,729,755 B2  
(45) Date of Patent: May 20, 2014

(54) INTERMEDIATE CONNECTION MEMBER, STATOR AND MOTOR

(75) Inventors: Airi Nakagawa, Kyoto (JP); Tomoyoshi Yokogawa, Kyoto (JP)

(73) Assignee: Nidec Corporation, Kyoto (JP)

( * ) Notice: Subject to any disclaimer, the term of this patent is extended or adjusted under 35 U.S.C. 154(b) by 255 days.

(21) Appl. No.: 13/295,175

(22) Filed: Nov. 14, 2011

(65) Prior Publication Data

US 2012/0126646 A1 May 24, 2012

(30) Foreign Application Priority Data

Nov. 19, 2010 (JP) ................................. 2010-258790

(51) Int. Cl.  
*H02K 11/00* (2006.01)

(52) U.S. Cl.  
USPC .......................................... 310/71; 310/68 R

(58) Field of Classification Search  
USPC ................................................. 310/71, 68 R  
See application file for complete search history.

(56) References Cited

U.S. PATENT DOCUMENTS

| 4,689,023 A * | 8/1987 | Strong et al. ................... 439/189 |
| 2003/0201688 A1 | 10/2003 | Yamamura et al. |
| 2005/0001494 A1 * | 1/2005 | Kuribayashi et al. ........... 310/71 |
| 2005/0253466 A1 | 11/2005 | Seguchi et al. |
| 2006/0091746 A1 * | 5/2006 | Takeuchi ......................... 310/71 |
| 2007/0210656 A1 * | 9/2007 | Lafontaine et al. ............. 310/58 |
| 2009/0230793 A1 * | 9/2009 | Hirao ............................... 310/71 |
| 2009/0256439 A1 * | 10/2009 | Inoue et al. ...................... 310/71 |
| 2010/0123360 A1 * | 5/2010 | McDowall et al. ............. 310/71 |
| 2010/0201213 A1 * | 8/2010 | Kataoka et al. ................. 310/71 |
| 2011/0012450 A1 * | 1/2011 | Umeda et al. ................... 310/71 |

FOREIGN PATENT DOCUMENTS

| JP | 2003-324883 A | 11/2003 |
| JP | 2005-328661 A | 11/2005 |
| JP | 2009-290921 A | 12/2009 |

* cited by examiner

*Primary Examiner* — Thanh Lam  
(74) *Attorney, Agent, or Firm* — Keating & Bennett, LLP

(57) ABSTRACT

An intermediate connection member which electrically connects an output terminal of a bus bar installed inside a motor case with an external connection terminal located in a distance from the output terminal. The intermediate connection member preferably includes both of a terminal member which is connected to the output terminal and a connecting line which is connected to the external connection terminal. The connecting line is defined by binding a plurality of wire rods together.

8 Claims, 12 Drawing Sheets

INTERMEDIATE CONNECTION MEMBER, STATOR AND MOTOR

BACKGROUND OF THE INVENTION

1. Field of the Invention

The present invention relates to an intermediate connection member which electrically connects an output terminal of a bus bar connected to a plurality of coils and an external connection terminal.

2. Description of the Related Art

The shape or arrangement of an external connection terminal 102 of a motor 101 which is used for connecting the motor 101 with an external power supply varies in accordance with the connecting specifications. For example, the external connection terminal 102 may be installed to extend in the radial direction of the motor 101, as illustrated in FIG. 8a and FIG. 8b. Otherwise, the external connection terminal 102 may be installed to extend in the axial direction of the motor 101, as illustrated in FIG. 8c and FIG. 8d.

Further, for example, the external connection terminals 102 may be arranged closely together as illustrated in FIG. 8a, or each of the external connection terminals may be arranged to be spaced out from each other as illustrated in FIG. 8b. The shape of the external connection terminal 102 can be formed by compressing, screw fixing, or inserting. That is, the external connection terminal 102 is required to have various shapes in accordance with the type of connection with the connecting specification.

Conventionally, the external connection terminal 102, which is required to have various arrangements and shapes, is formed by press working on a metal plate to correspond to each of specifications. Further, it was common to form the external connection terminal 102 integrally with a bus bar 103, as shown in FIGS. 9a-9d, connected to a plurality of coils.

Japanese Patent Application Publication No. 2009-290921 discloses a conventional brushless motor where a power feeding portion for combining a connector terminal of the power supply connector is provided in a bus bar.

Also, Japanese Patent Application Publication No. 2005-328661 discloses a conventional electric rotary machine comprising a ring-shaped terminal block where a group of bus bars is molded within an electric insulating member. The group of bus bars has three output lines serving as the external connection terminals, and the output lines are protruded from the terminal block.

The brushless motor disclosed in Japanese Patent Application Publication No. 2009-290921 is applicable to various specifications of the external connection terminal by modifying the shape of the connector terminal. However, depending on the specification of the external connection terminal, the shape of the connector terminal may become complicated, which makes it difficult to manufacture the complicated connector terminal. This would also be disadvantageous in terms of the expense. Further, since the connector terminal needs to be combined with a power feeding portion, making the connection requires labor, and it would be difficult to be automatized.

The electric rotary machine disclosed in Japanese Patent Application Publication No. 2005-328661 uses flexible output lines as external connection terminals. Accordingly, the external connection terminals can be connected relatively easily, compared to an external connection terminal formed by press working. In such regard, the electric rotary machine disclosed in Japanese Patent Application Publication No. 2005-328661 can be applicable to various specifications with a single terminal block.

However, since the output line is molded integrally within the terminal block by a resin, it is difficult to determine from the external appearance whether there is any connection error between the bus bar group and the output line at the time of processing the molding. Accordingly, every terminal block needs to be checked with a continuity test, which requires significant effort.

The above and other elements, features, steps, characteristics and advantages of the present invention will become more apparent from the following detailed description of the preferred embodiments with reference to the attached drawings.

SUMMARY OF THE INVENTION

Therefore, preferred embodiments of the present invention provide an intermediate connection member which is arranged to correspond to various specifications of the external connection terminal, and thus works towards improving the productivity of the motor.

According to a preferred embodiment of the present invention, the configuration of an intermediate connection member is arranged to provide an interface between an output terminal of a bus bar and an external connection terminal.

Specifically, the intermediate connection member of the present invention electrically connects an output terminal of a bus bar connected to a plurality of coils installed inside a motor case and an external connection terminal located in a distance from the output terminal.

The intermediate connection member preferably comprises a terminal member arranged to be connected to the output terminal, and a connecting line fixed to the terminal member and arranged to be connected to the external connection terminal. Further, the connection line is provided by binding a plurality of wire rods together.

The terminal member connectable to the output terminal of the bus bar or the connecting line connectable to the external connection terminal is provided in the intermediate connection member. In this regard, the connection status between the output terminal and the terminal member, and the connection status between the connecting line and the external connection terminal can be checked during or after the connection is made. Accordingly, there would be no need to perform a separate continuity test, which allows the intermediate connection member to provide excellent productivity.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 9a is a schematic perspective view showing the shape of the bus bar in FIG. 8a.

DETAILED DESCRIPTION OF THE PREFERRED EMBODIMENTS

Set forth below are detailed descriptions of preferred embodiments of the present invention based on the drawings. Yet, the descriptions below are merely examples, and they do not necessarily imply any limitations on the present invention, where it is applied, or how it is used.

Figure 1:
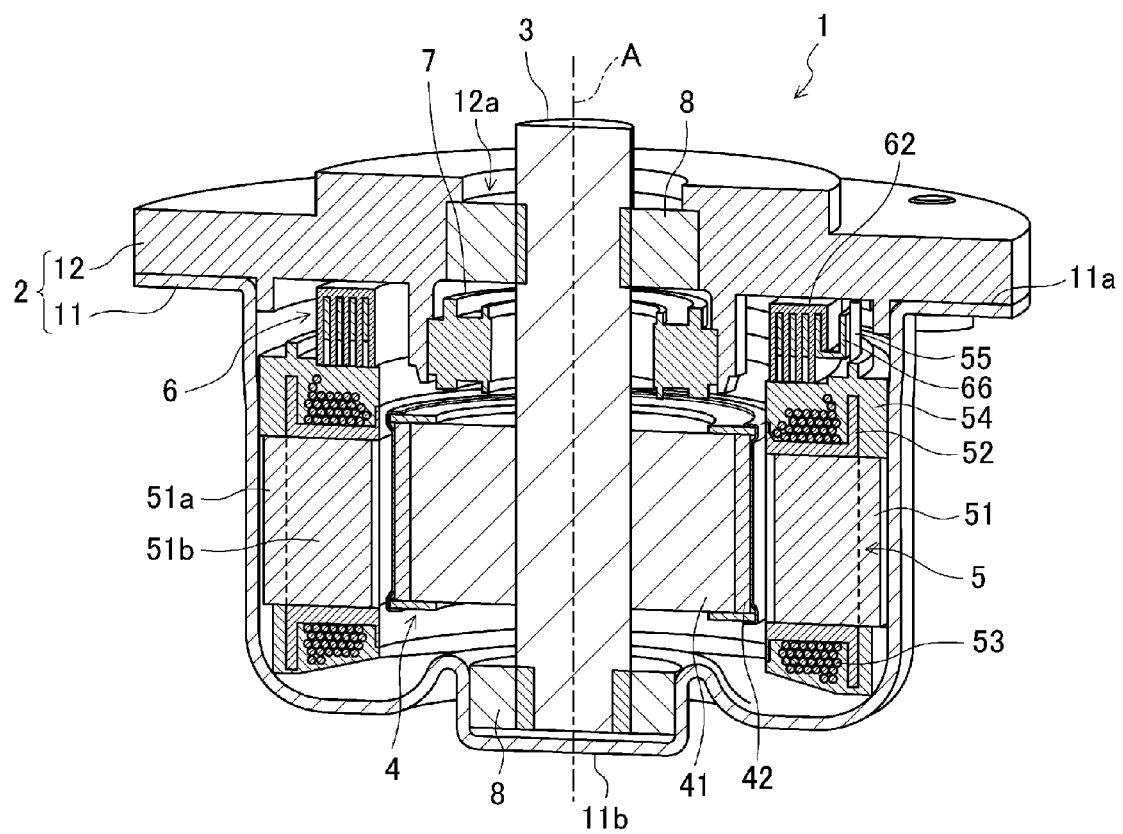
FIG. 1 is a schematic view showing a cross section of the motor according to a present preferred embodiment of the present invention.

FIG. 1 shows the motor according to a preferred embodiment of the present invention. The motor 1 is an inner rotor type brushless motor. The motor 1 preferably includes a motor case 2, a shaft 3, a rotor 4, a stator 5, a bus bar unit 6, and a rotation angle sensor 7.

The respective centers of the rotor 4, the stator 5, and the bus bar unit 6 are preferably disposed to approximately overlap with the central axis A of the shaft 3. Hereinafter, a direction extending in parallel or substantially in parallel with the central axis A will be referred to as the "axial direction," a direction orthogonal or substantially orthogonal to the central axis A will be referred to as the "radial direction," and a direction around the circumference of the central axis A will be referred to as the "circumferential direction," when explaining each element shown in FIG. 1.

The motor case 2 preferably includes a housing 11 having a cylindrical shape and including an opening on one end surface, and a cover 12 approximately in a disc shape. A flange 11a is arranged to protrude from around the opening of the housing 11. The cover 12 is fixedly connected to the flange 11a. A shaft hole 12a is arranged in the center of the cover 12. A bearing portion 11b is arranged on the other surface of the housing 11 facing the shaft hole 12a. A shaft 3 is arranged inside the housing 11 which is arranged to be closed by the cover 12.

A bearing 8 is respectively provided inside each of the bearing portion 11b and the shaft hole 12a. The shaft 3 is rotatably supported with respect to the motor case 2 through the bearings 8. One end portion of the shaft 3 is arranged to protrude to the outside of the cover 12 through the shaft hole 12a. The rotation driving power of the motor 1 is outputted through the end portion.

A rotor 4 is concentrically fixed around an intermediate portion of the shaft 3. The rotor 4 preferably includes a rotor core 41 having a cylindrical shape and a magnet 42. The magnet 42 is disposed on the outer circumferential surface of the rotor core 41. The magnetic poles of the magnet 42 are preferably arranged so that the N-poles and the S-poles are alternatively arranged in the circumferential direction. A stator 5 having a cylindrical shape is disposed around the rotor 4. The stator 5 is fixed inside the housing 11. The inner circumferential surface of the stator 5 is disposed to oppose the outer circumferential surface of the rotor 4 with a minute air gap being provided therebetween.

Figure 2:
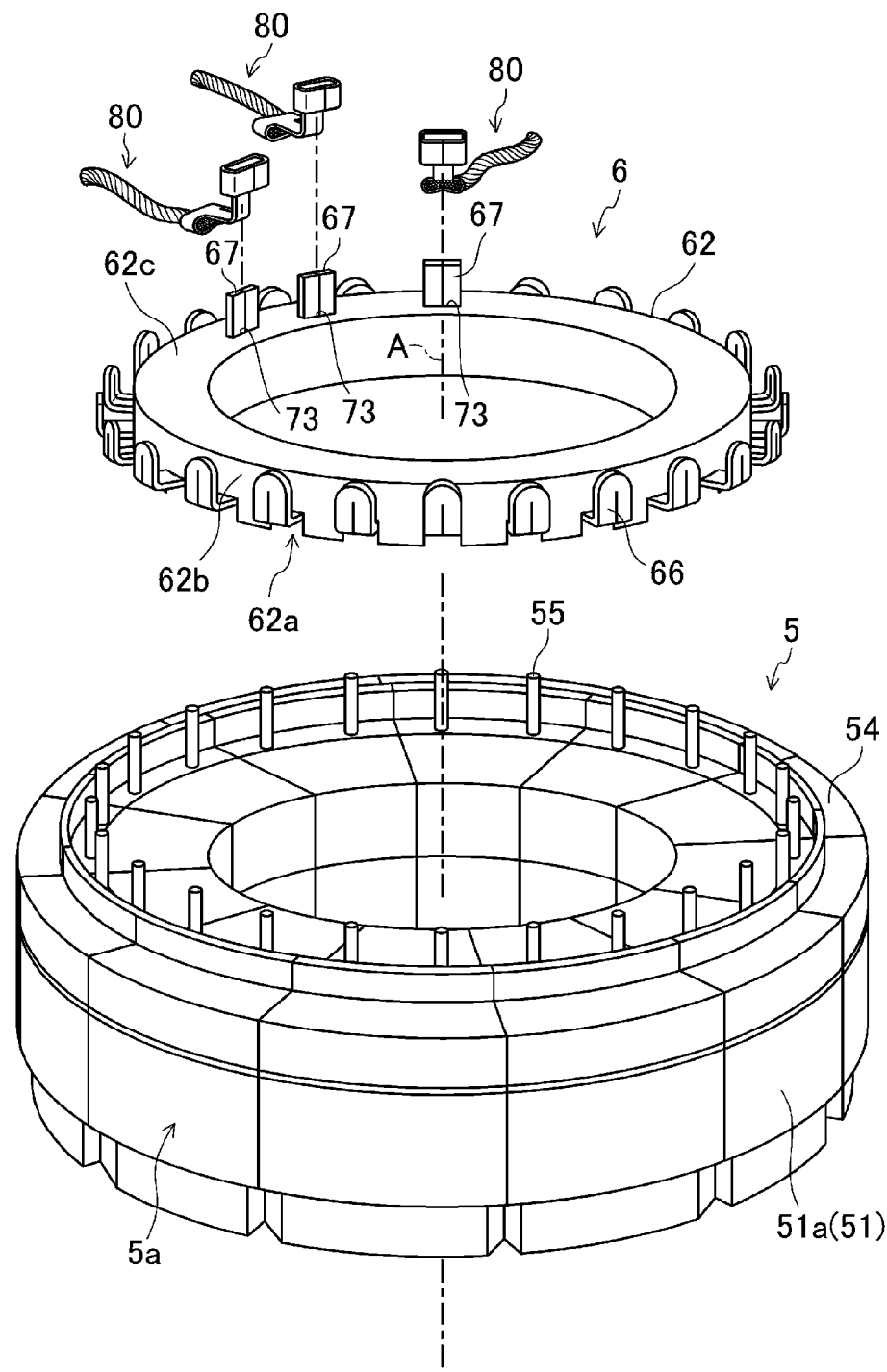
FIG. 2 is a schematic perspective view showing a relationship among the stator, the bus bar unit, and the relay terminal.

As illustrated in FIG. 2, the stator 5 is preferably provided in a cylindrical shape by connecting a plurality of divisional stators 5a together, however, any other desirable type of stator could be used. Further, the stator 5 preferably includes a stator core 51, an insulator 52, a coil 53, and an encapsulating resin layer 54.

The stator core 51 is preferably arranged to have a cylindrical shape by connecting the plurality of divisional stators 5a together, the plurality of divisional stators 5a preferably being defined by laminating a plurality of steel plates. Specifically, the stator core 51 preferably includes a core back portion 51a in a cylindrical shape, and a plurality of teeth portions 51b radially arranged inside the core back portion 51a. An electrically insulating insulator 52 is preferably provided about the stator core 51.

A coil 53 is preferably formed by winding a conductive wire such as, for example, an enamel-coated copper wire around each of the plurality of teeth portions 51b provided with the insulator 52. End portions of the conductive wire [wire ends 55] wound around each teeth portion 51b are led out from one end portion [end portion disposed toward the opening side of the housing 11, in other words, end portion of the output side] of the stator. The led out wire end 55 is arranged to extend in the axial direction. The coil 53 is preferably embedded within a resin layer 54 by being molded therewith, except that front ends of the wire ends 55 are not embedded.

Figure 3:
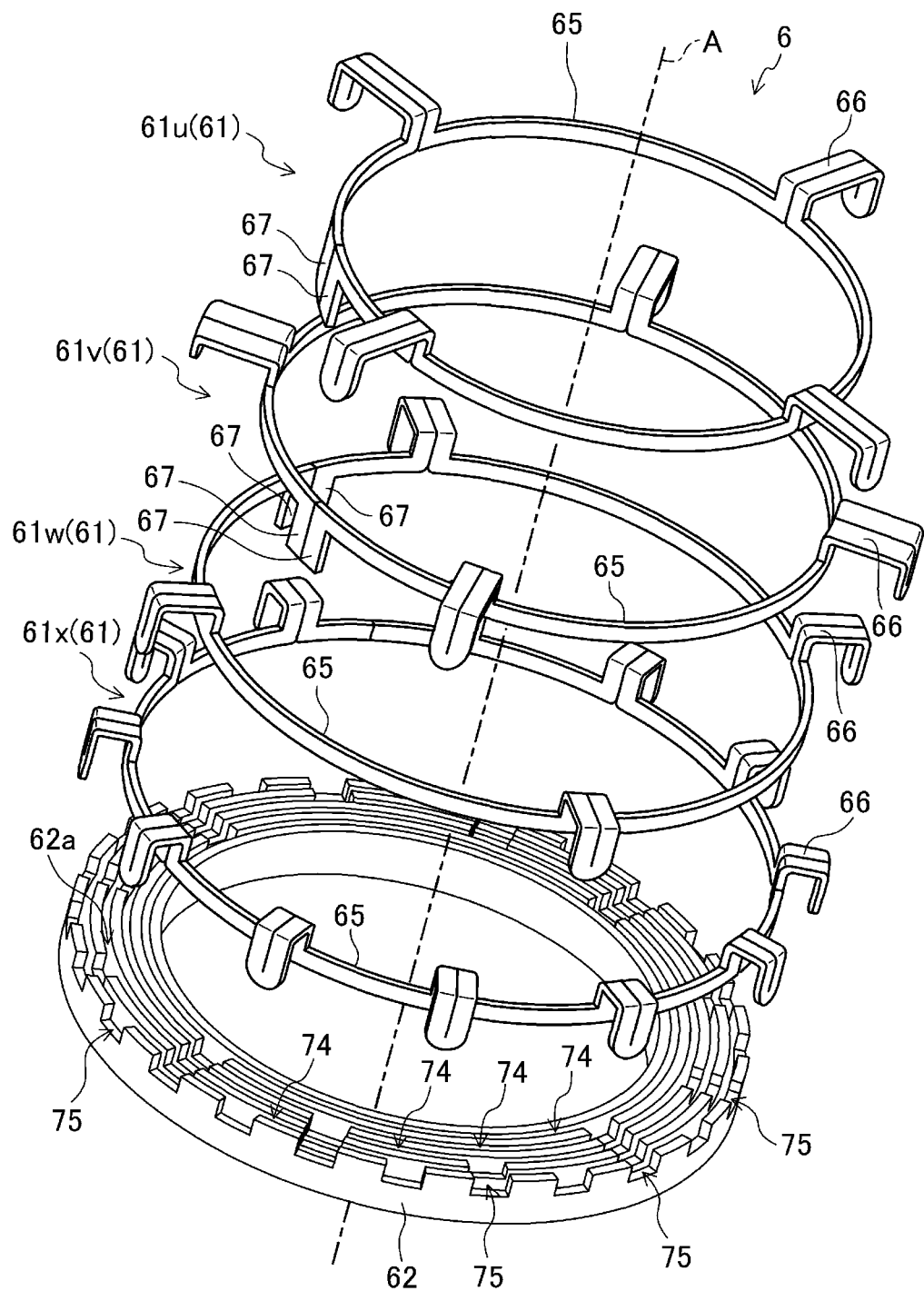
FIG. 3 is a disassembled perspective view showing an arrangement of the bus bar unit.

The bus bar unit 6 is attached to the end portion of the output side of the stator 5, and connected to each wire end 55. FIG. 3 illustrates details of the bus bar unit 6. The bus bar unit 6 comprises a plurality (preferably four in this preferred embodiment) of bus bars 61 and an insulating adaptor 62 arranged to support these bus bars 61.

Specifically, the bus bar 61 preferably comprises three phase bus bars 61u, 61v, 61w respectively connected to each coil group of a U-phase, a V-phase, and a W-phase of the stator 5, and a single common bus bar 61x connected to a neutral point, wherein each coil 53 is arranged in Y-connection.

Each bus bar 61 preferably includes a body portion 65 preferably defined by a thin and long strip plate shape curved in a thickness direction into a ring shape, and a plurality of terminal portions 66 integrally provided with the body portion 65. The body portion 65 of each bus bar 61 is preferably arranged to have different diameters.

Also, each of the phase bus bars 61 preferably includes two output terminals 67 (sometimes the output terminals 67 are arranged to join each other) having a strip plate shape integrally provided with the body portion 65 as a single monolithic member. The output terminals 67 of this preferred embodiment are preferably produced to have a rectangular shape, and to extend from each of two ends of the body portion 65 equally toward an approximately orthogonal direction to the body portion 65. The output terminal 67 preferably is provided on a side opposite to the terminal portion 66 with the body portion 65 arranged therebetween.

The adaptor 62 is preferably a resin member produced by, for example, injection molding a resin material. Further, the adaptor 62 is preferably provided in a circular ring shape having a rectangular or substantially rectangular cross section in accordance with the shape of the stator 5. A plurality of body supporting grooves 74 arranged concentrically with one another and a plurality of terminal supporting grooves 75 extending in the radial direction are provided on the rear surface 62a of the adaptor 62. The body portion 65 of each bus bar 61 is respectively received in respective ones of the body supporting grooves 74. Also, the terminal portion 66 of each bus bar 61 is respectively received in respective ones of the terminal supporting grooves 75.

When each bus bar 61 is inserted in the adaptor 62, as illustrated in FIG. 2, the front end of each terminal portion 66 protrudes to the outside of the adaptor 62, and extends to the axial direction to face the outer circumferential surface 62b of the adaptor 62. The bus bar unit 6 is preferably arranged to be adjacent to the end portion of the output side of the stator 5 such that it overlaps the center of the bus bar unit 6 with the center of the stator 5 to be aligned in the circumferential direction to thereby bring each of terminal portions 66 and each of wire ends 55 facing each other together. Then, the wire ends 55 and the terminal portions 66 adjacent to each other are preferably respectively joined together by, for example, being welded together.

A terminal hole 73 is provided in three places on the surface 62c of the adaptor 62. The output terminals 67 of each phase bus bar 61 preferably protrude through these terminal holes 73 in the axial direction. A relay terminal 80 is preferably attached to each of the output terminals 67.

Figure 4:
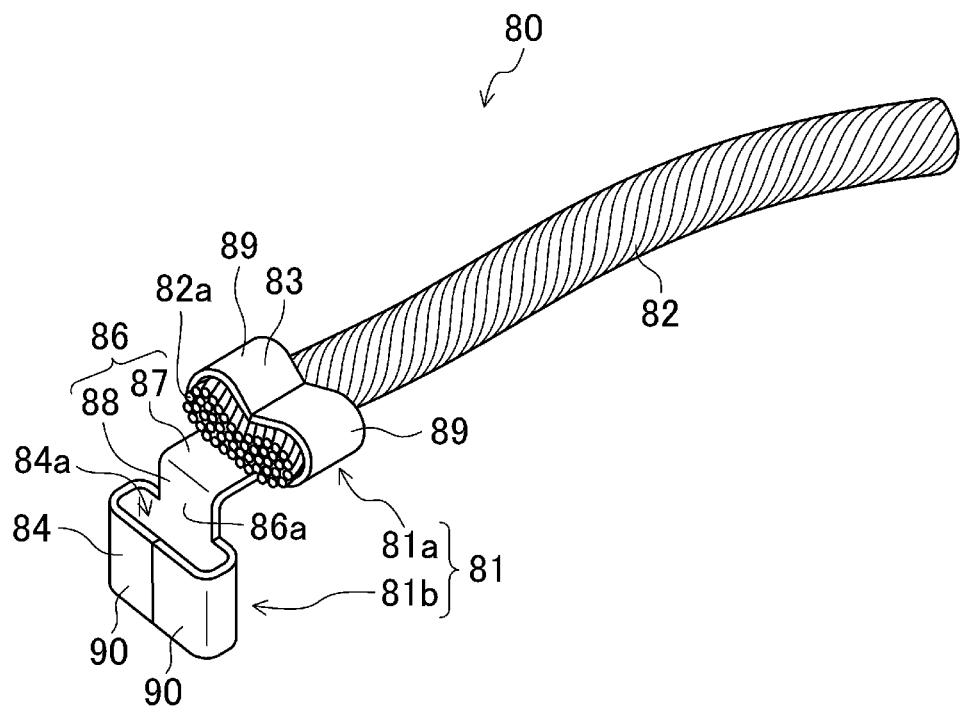
FIG. 4 is a schematic perspective view of the relay terminal.

FIG. 4 illustrates an example of a relay terminal 80 according to a preferred embodiment of the present invention. The relay terminal 80 preferably includes a terminal member 81 arranged to be connected to an output terminal 67, and a connecting line 82 arranged to be connected to an external connection terminal 92 [to be described in greater detail later]. An annealed copper stranded wire is preferably used as the connecting line 82 of the present preferred embodiment, the annealed copper stranded wire defined by twisting a plurality of thin wire rods 82a [annealed copper wire in the preferred embodiment] into a spiral shape. However, it should be noted that any other desirable type of electrical conductor could be used as the connecting line 82.

It is preferable to set the gross sectional area of the connecting line 82 [total of sectional areas of the wire rods 82a] to be larger than the minimum transverse sectional area of the bus bar 61 or the sectional area of a conductive wire of the coil 53. Under such condition, it is possible to prevent excessive electrical resistance from being provided by the connecting line 82 even if a significant electric current is supplied into the motor 1 to produce a maximum output.

The terminal member 81 preferably includes a first connection portion 81a and a second connection portion 81b. A compressing portion 83 is preferably provided in the first connection portion 81a, and one end of the connecting line 82 is arranged to be compressed by the compressing portion 83. A welding portion 84, where the output terminal 61 is welded, is preferably provided in the second connection portion 81b.

Specifically, the terminal member 81 preferably includes a base portion 86 including a middle portion bent into an approximately L-shaped form. The base portion 86 preferably includes a first section 87 and a second section 88 each extending from the bent position toward a different direction from each other. The first section 87 preferably includes a pair of first curved arm portions 89 extending from two sides of the first section 87 toward the opposite direction to each other. These first curved arm portions 89 are curved to a direction where each of front ends is facing each other. The first section 87 and the first curved arm portion 89 correspond to the above-mentioned first connection portion 81a, and the compressing portion 83 is formed by these elements.

Also, the second section 88 preferably includes a pair of second curved arm portions 90 extending from two sides of the second section 88 toward the opposite direction to each other. These second curved arm portions 90 are also curved to a direction where each of front ends is facing each other. The second section 88 and the second curved arm portion 90 correspond to the above-mentioned second connection portion 81b, and the welding portion 84 is defined by these elements. The first curved arm portion 89 and the second curved arm portion 90 are both provided on the surface of the base portion 86 [open surface 86a] which is in the opposite side of the bending direction of the base portion 86.

Figure 5A:
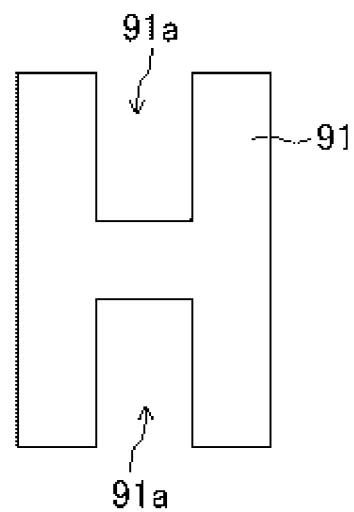
FIG. 5a is a schematic view illustrating a process for manufacturing the relay terminal.

The terminal member 81 with such an above-described configuration can preferably be formed by a method, for example, illustrated in FIG. 5a, FIG. 5b, FIG. 5c, and FIG. 5d. That is, as illustrated in FIG. 5a, a base member 91 is formed by pressing a metal plate. Slits 91a are formed from both sides on a center portion of the base member 91, and the base member 91 is formed to have an outline of an approximately H-shape. It is preferable to form the slit 91a with a small size, such that, for example, only a notch is formed as the slit 91a. With such configuration, high yield rate for the metal plate can be realized, while the shape of the base member 91 can be obtained.

Figure 5B:
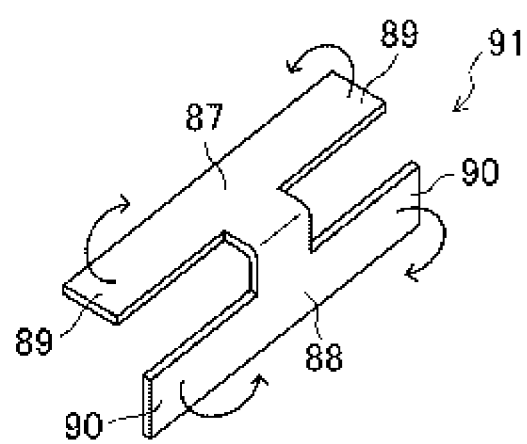
FIG. 5b is a schematic view illustrating a process for manufacturing the relay terminal.
Figure 5C:
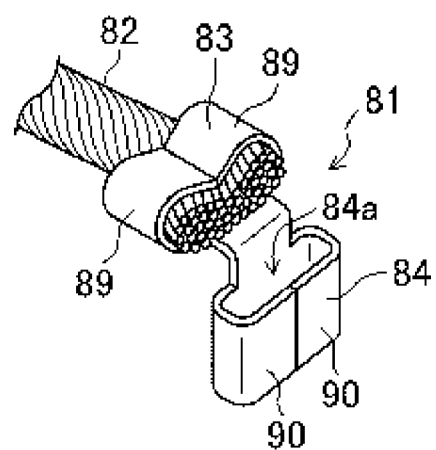
FIG. 5c is a schematic view illustrating a process for manufacturing the relay terminal.

Subsequently, as illustrated in FIG. 5b, the first section 87 and the second section 88 are formed by bending the portion of the base member 91 interposed between the slits 91a. Further, the first curved arm portion 89 and the second curved arm portion 90 are formed by bending the first section 87 and the second section 88 respectively as indicated with the arrowed lines. When forming the first curved arm portion 89, as illustrated in FIG. 5c, the compressing portion 83 is formed by inserting one end of the connecting line 82 between the first section 87 and the first curved arm portion 89 and compressing the same.

Meanwhile, the welding portion 84 is formed by bending the second curved arm portion 90 into the shape corresponding to the shape of the output terminal 67. The welding portion 84 is thus arranged to provide a terminal inserting portion 84a into which the output terminal 67 can be inserted. Specifically, the second curved arm portion 90 is bent and, processed into a cylindrical shape having an inner size slightly larger than the outer size of the output terminal 67.

It is preferable to make the terminal member 81 from the same kind of metal that is used to make the output terminal 67. For example, when the bus bar 61 is made from a copper-based metal, the terminal member 81 is also preferably made with a copper-based metal. Further, when the bus bar 61 is made from an aluminum-based metal, the terminal member 81 is also preferably made from with an aluminum-based metal. The copper-based metal mentioned in this preferred embodiment refers to copper alone and also to alloy composed mainly of copper. Further, the aluminum-based metal refers to aluminum alone and also to an alloy composed mainly of aluminum.

Under such conditions, the output terminal 67 and the terminal member 81 can be easily and stably welded since they are formed with the same kind of metal and accordingly have same or similar properties.

Further, when different kinds of metal are used for the output terminal 67 and the terminal member 81, for example, when the output terminal 67 is made with a copper-based metal, and the terminal member 81 is made with an aluminum-based metal, it is preferable that the surface of the terminal member 81 or at least the surface of the terminal inserting portion 84a is tin plated. Under such conditions, even though different kinds of metal are used, the output terminal 67 and the terminal member 81 can be easily and stably welded.

In the relay terminal 80 having such configuration, the welding portion 84 is brought closer to the output terminal 67 of each phase bus bar 61 from the axial direction as illustrated in FIG. 2, and the output terminal 67 is inserted into the terminal inserting portion 84a. With such configuration, the relay terminal 80 can be easily and temporarily fixed to the bus bar unit 6.

Figure 6:
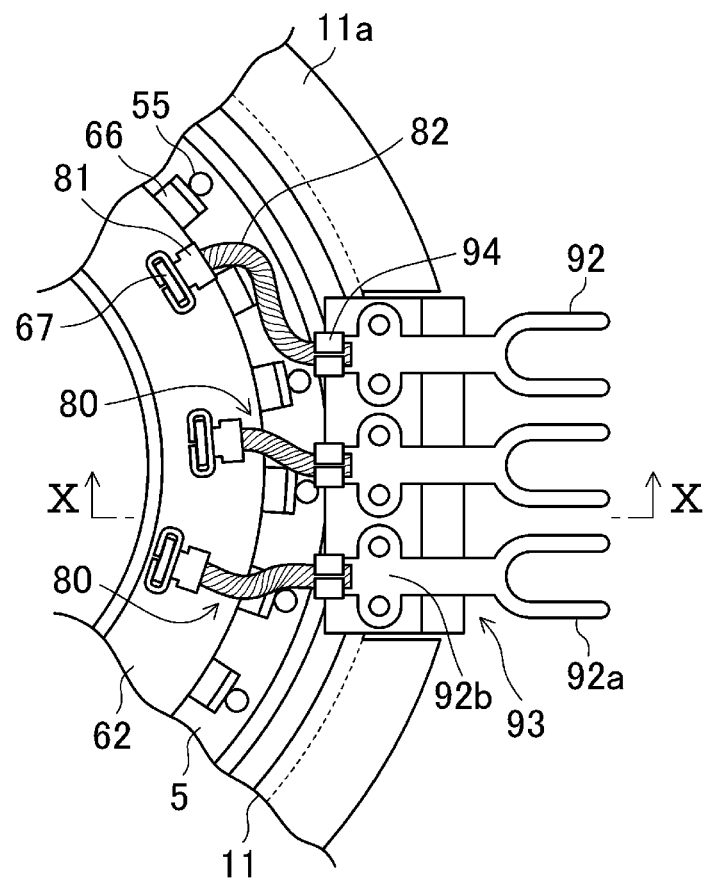
FIG. 6 is a schematic plan view showing a principal portion of the motor.
Figure 7:
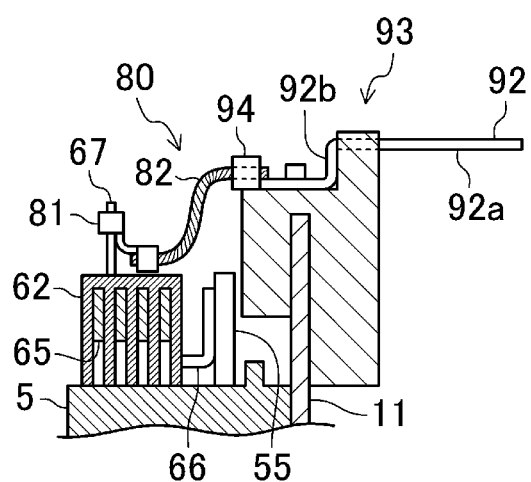
FIG. 7 is a schematic sectional view in X-X line of FIG. 6.
Figure 8A:
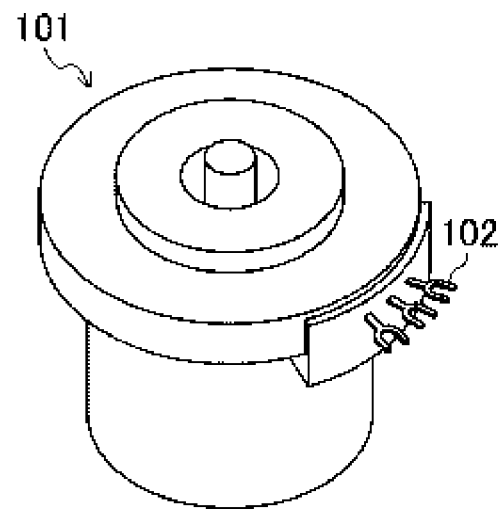
FIG. 8a is a schematic perspective view showing the shape of the external connection terminal of a conventional motor.
Figure 8B:
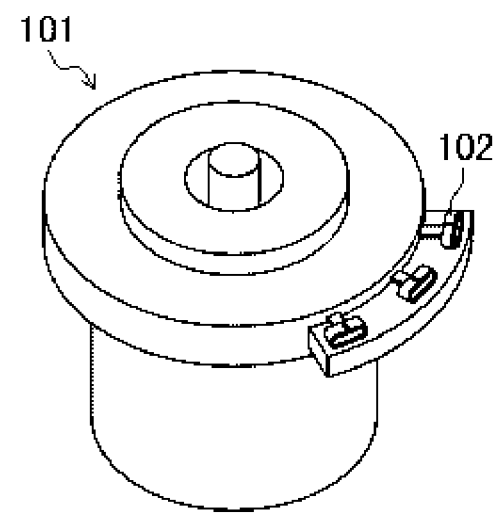
FIG. 8b is a schematic perspective view showing the shape of the external connection terminal of a conventional motor.
Figure 8C:
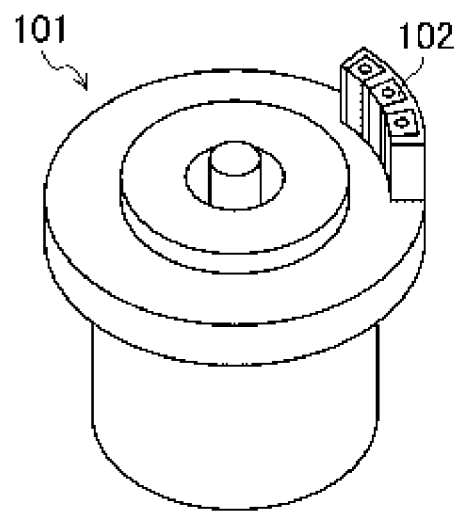
FIG. 8c is a schematic perspective view showing the shape of the external connection terminal of a conventional motor.
Figure 8D:
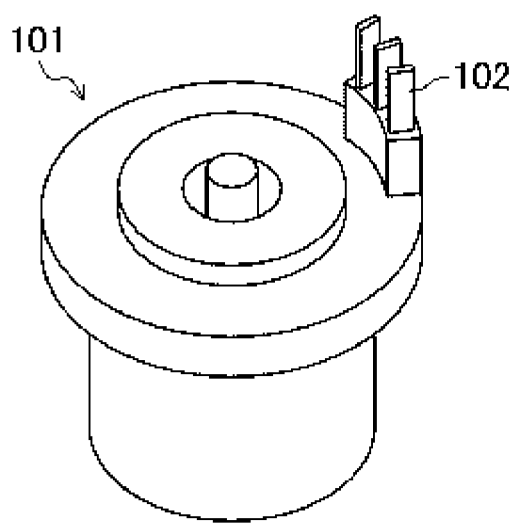
FIG. 8d is a schematic perspective view showing the shape of the external connection terminal of a conventional motor.
Figure 9A:
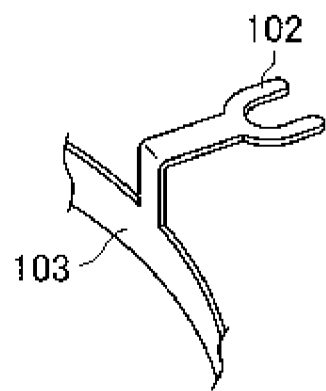
Figure 9B:
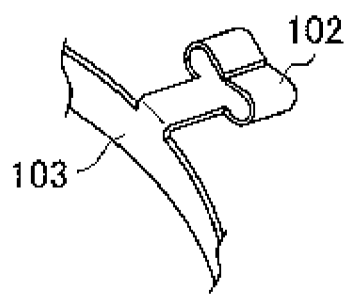
FIG. 9b is a schematic perspective view showing the shape of the bus bar in FIG. 8b.
Figure 9C:
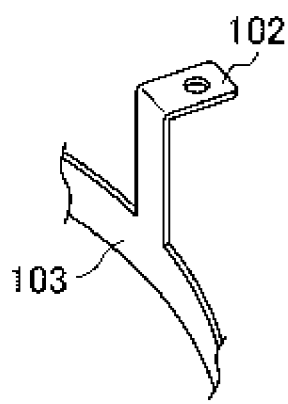
FIG. 9c is a schematic perspective view showing the shape of the bus bar in FIG. 8c.
Figure 9D:
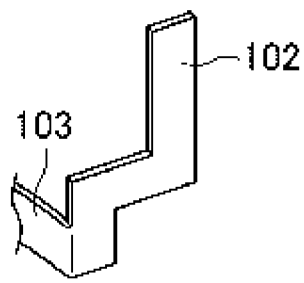
FIG. 9d is a schematic perspective view showing the shape of the bus bar in FIG. 8d.

As illustrated in FIG. 2, when inserting the output terminal 67 into the terminal inserting portion 84a, the output terminal 67 is preferably inserted from the side of the compressing portion 83 [the side of open surface 86a]. By doing this, as illustrated in FIG. 6 and FIG. 7, the compressing portion 83 is provided at a location closer to the surface 62c of the adaptor 62 than the welding portion 84. Accordingly, when welding the welding portion 84 and the output terminal 67 preferably by, for example, resistance welding, the compressing portion 83 or the connecting line 82 will not be an obstacle. Since a jig arranged to assist in welding can be brought closer to the welding portion 84 from the upper axial direction, the welding process also becomes easier.

Further, since the compressing portion 83 is provided adjacent to the open surface 86a [which faces the adaptor 62], the upper space over the compressing portion 83 in the axial direction can be used more efficiently. Accordingly, the welding process such as, for example, resistance welding can be more easily performed. Moreover, it is preferable that the front end of the output terminal 67 protrudes out from the welding portion 84. With such a configuration, welding can be easily performed and the quality of the connection between the output terminal 67 and the welding portion 84 can be easily confirmed. Also, because of this arrangement, the present process can be easily automated.

Subsequently, the output terminal 67 and the welding portion 84 are welded preferably by a welding method such as, for example, resistance welding. Since the connection status between the output terminal 67 and the terminal member 81 can be observed even through bare eyesight alone, it is not necessary to perform a separate continuity test. Since the relay terminal 80 is temporarily fixed to the bus bar unit 6, it can be easily handled. The present process can be automatized as in the previous process. The bus bar unit 6 or the relay terminal 80 is installed to the stator 5, and then the stator 5 is arranged within the housing (11).

As illustrated in FIG. 6 and FIG. 7, an interface connection portion 93 preferably including an external connection terminal 92 on, for example, a resin terminal block is installed to the housing 11. The interface connection portion 93 according to the present preferred embodiment is preferably attached to a portion of the open end of the housing 11 provided with a cut-off flange 11a. Three external connection terminals 92 are installed to each of the U, V, and W phases in the interface connection portion 93.

The external connection terminal 92 is preferably a pressed product of, for example, a metal plate material. Each external connection terminal 92 preferably includes a protrusion portion 92a arranged to protrude to a position outside of the motor case 2, and a receiving portion 92b located inside the motor case 2 and fixed to the terminal block. A compressing terminal portion 94, in which compression is performed, is preferably provided on the receiving portion 92b, and the connecting line 82 of the relay terminal 80 is arranged to be compressed by the compressing terminal portion 94.

The connecting line 82 is preferably arranged such that it can be freely bent, and such that the length thereof can also be freely adjusted by cutting it. Accordingly, regardless of the configuration of the external connection terminal 92, the connecting line 82 and the external connection terminal 92 can be easily and appropriately connected. Further, since both can be connected just by compression, the connection can be made easily and stably without using highly developed equipments.

Also, the intermediate connection member according to the above described preferred embodiments is not limited by the described examples, and further comprises other various modifications.

For example, the connection method of the stator can be appropriately selected from, for example, a star connection, a delta connection, etc. The connection structure of each coil can be selected from any number of the connection structures such as, for example, a parallel connection, a series connection, a series/parallel connection, etc. The number of poles or slots of the motor can also be set variably to be any desired number in accordance with the required performance. The connecting line is not limited to an annealed copper stranded wire. Other materials having excellent electric conductivity, such as an aluminum-based metal, can be used, and the wire may also not be stranded, if so desired.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An intermediate connection member which is arranged to electrically connect an output terminal of a bus bar connected to a plurality of coils installed inside a motor case with a external connection terminal located at a distance from the output terminal, comprising:
    a terminal member arranged to be connected to the output terminal; and
    a connecting line fixed to the terminal member and arranged to be connected to the external connection terminal; wherein
    the connecting line is defined by binding a plurality of wire rods together; and
    the terminal member includes:
        a first connection portion including a compressing portion in which one end of the connecting line is compressed; and
        a second connection portion integrally provided with the first connection portion as a single monolithic member, and including a welding portion arranged to be welded with the output terminal.

2. The intermediate connection member according to claim 1, wherein the connecting line includes a gross sectional area that is substantially larger than a gross sectional area of a conductive wire defining the coil.

3. The intermediate connection member according to claim 2, wherein
    the coils are arranged on a stator in a cylindrical shape;
    the bus bar is installed on one axial end of the stator; and
    the output terminal is arranged to extend in parallel or substantially in parallel with a central line of the stator; and
    the welding portion including a terminal inserting portion in which the output terminal is arranged to be inserted.

4. The intermediate connection member according to claim 3, wherein the terminal member and the output terminal are made of the same metal material.

5. The intermediate connection member according to claim 4,
   wherein the terminal member is made with an aluminum-based metal; and
   a surface of the terminal inserting portion is tin plated.

6. The intermediate connection member according to claim 5,
   wherein the connecting line is made of an annealed copper stranded wire.

7. A stator comprising the intermediate connection member according to claim 6.

8. A motor comprising the stator of claim 7.

* * * * *